United States Patent Office 2,827,392
Patented Mar. 18, 1958

2,827,392

INHIBITION OF BUBBLE FORMATION IN A SETTLING PROCESS

Peter Seats, Lake Hiawatha, N. J., assignor to Thomas Electronics, Inc., Passaic, N. J., a corporation of New Jersey No Drawing. Application August 31, 1955
Serial No. 531,815

1 Claim. (Cl. 117—33.5)

This invention relates to an improved process for producing luminescent coatings and more particularly relates to an improved process of providing a luminescent screen within a bulb by means of a settling process.

In the conventional aqueous settling technique for producing cathode ray tubes, luminescent matter is introduced into the tube in an aqueous suspension and is allowed to settle out of the solution and to adhere to the glass wall. This technique may be seen, for example, in the following patents: 2,619,472; 2,298,968; 2,678,888; and 2,344,081. After deposit of the luminescent material, the excess of the aqueous suspension is customarily poured off or decanted, and the luminescent field is submitted to various drying steps and to further processing.

This settling process is subject to certain disadvantages and I have found that difficulties sometimes arise due to the presence of small bubbles on the surface of the water in the cathode ray tube bulb, which persist throughout the duration of the settling period, and which frequently damage the luminescent screen during the pouring off operation as they move across the screen with the edge of the water. It is thought that these bubbles are formed or are stabilized by organic impurities in the water which are not removed in the customary water purification processes, or which enter into or form in the water after such treatment. While numerous attempts have been made in the past to overcome this difficulty through the use of various solvents none have yielded completely satisfactory results.

It is accordingly a primary object of the present invention to provide an improved settling process for the formation of luminescent screens.

It is another object of this invention to provide a low cost method of inhibiting bubble formation in aqueous systems.

It is another object of this invention to substantially eliminate damage to cathode ray tube screens caused by the dragging of bubbles across the screen during the decanting of the screen-settling fluid, or of other fluids used in the processing of luminescent screens.

According to the present invention, it has been found that if a small quantity of normal octyl alcohol is added to the water which is used in the cathode ray tube bulb, the formation of stable bubbles is quite rare and the number of screens damaged by bubbles is reduced to an extremely low figure.

Under normal conditions a suitable concentration is 10 parts of normal octyl alcohol per million parts of water and the normal octyl alcohol may be conveniently introduced at the stage of the process when the conventional alkaline earth salt is dissolved in a large supply of water to form the "cushion" water. Agitation is necessary since the alcohol is not readily soluble and will float on the water unless mixed. If an automatic cushion supply system is used, it may be preferred to dissolve the octyl alcohol in a lower alcohol to form a diluted solution before injection into the aqueous solution.

In addition to normal octyl alcohol other octyl alcohols, such as ethyl hexyl alcohol, also have been found to have a capacity for inhibiting bubble formation, although their effect is not of the same order as that of normal octyl alcohol. The normal octyl alcohol is substantially superior to other octyl alcohols in inhibiting bubble formation and through its use in a screen settling process, screen bubble damage has been reduced to negligible amounts.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claims are therefore intended to be embraced therein.

What is claimed and desired to be secured by United States Letters Patent is:

In the process of forming luminescent coatings by means of a settling process wherein water must be removed from above said coating, the steps comprising dissolving ten parts of normal octyl alcohol in each million parts of said water prior to the time it covers said coating, and pouring said water off of said coating.

References Cited in the file of this patent

UNITED STATES PATENTS

| | | |
|---|---|---|
| 2,045,551 | Iddings | June 23, 1936 |
| 2,085,709 | Steibelt | June 29, 1937 |
| 2,147,415 | Tucker | Feb. 14, 1939 |
| 2,220,700 | Atwood | Nov. 5, 1940 |
| 2,684,306 | Brewer et al. | July 20, 1954 |
| 2,686,157 | Jones | Aug. 10, 1954 |
| 2,756,167 | Barnett | July 24, 1956 |

OTHER REFERENCES

"Chemical and Technical Dictionary," Bennett (1947), pages 380 and 677.